United States Patent
Wu

(10) Patent No.: US 10,422,905 B2
(45) Date of Patent: *Sep. 24, 2019

(54) QUANTIFYING GEOLOGIC GROWTH HISTORY OF SUBSURFACE OIL FIELD STRUCTURES BASED ON STRUCTURAL GROWTH INDICATIONS WITH INSTRUCTIONS FROM DATA STORAGE DEVICE

(71) Applicant: Saudi Arabian Oil Company, Dhahran (SA)

(72) Inventor: Schuman Wu, Sugarland, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,170

(22) Filed: Apr. 5, 2019

(65) Prior Publication Data

US 2019/0235111 A1    Aug. 1, 2019

Related U.S. Application Data

(62) Division of application No. 15/173,918, filed on Jun. 6, 2016, now Pat. No. 10,295,686.

(51) Int. Cl.
*G01V 1/40* (2006.01)
*G01V 1/30* (2006.01)
(Continued)

(52) U.S. Cl.
CPC ............. *G01V 1/306* (2013.01); *E21B 49/00* (2013.01); *G01V 1/28* (2013.01); *G01V 1/345* (2013.01); *G01V 1/40* (2013.01); *G01V 99/005* (2013.01)

(58) Field of Classification Search
None
See application file for complete search history.

(56) References Cited

U.S. PATENT DOCUMENTS 6,256,603 B1    7/2001   Celniker
7,523,024 B2    4/2009   Endres et al.
(Continued)

OTHER PUBLICATIONS

International Search Report and Written Opinion dated Aug. 17, 2017 for corresponding PCT/US2017/035244.
(Continued)

*Primary Examiner* — Aditya S Bhat
(74) *Attorney, Agent, or Firm* — Bracewell LLP; Constance G. Rhebergen; Albert B. Kimball, Jr.

(57) ABSTRACT

A measure of structural growth of subsurface geological formations layers or intervals is obtained to investigate and analyze layer structure development history. The measure or indication can be considered a structural growth index (SGI) and is used to evaluate for possible presence of hydrocarbons in the layers or strata in a structure of concern. The structural growth measure or index for a given geologic interval of interest is defined as the ratio of the layer thickness difference measured at two selected locations, one at a structural high and the other at a structural low of layer or interval, over the larger number of the paired-thickness measurements. The structural growth measure is determined for a series of sequentially layered geologic formations of interest and displays of determined measures are formed as functions of geologic time for the formations. Based on the structural growth measure, the geologic growth history of the given oil field structure is revealed quantitatively.

7 Claims, 8 Drawing Sheets

(51) Int. Cl.
   *G01V 99/00*   (2009.01)
   *E21B 49/00*   (2006.01)
   *G01V 1/34*    (2006.01)
   *G01V 1/28*    (2006.01)

(56) References Cited

U.S. PATENT DOCUMENTS

| | | |
|---|---|---|
| 7,756,694 B2 | 7/2010 | Graf et al. |
| 8,676,856 B2 * | 3/2014 | Bruaset ............... G06F 16/2246 707/797 |
| 8,798,974 B1 | 8/2014 | Nunns |
| 8,958,267 B2 | 2/2015 | Eick et al. |
| 2006/0047429 A1 | 3/2006 | Adams |
| 2006/0253759 A1 | 11/2006 | Wei |
| 2009/0265152 A1 | 10/2009 | Cacas et al. |
| 2012/0044784 A1 | 2/2012 | Pierle |

OTHER PUBLICATIONS

Hudleston, Peter J., and Susan H. Treagus. "Information from folds: a review." Journal of Structural Geology 32.12 (2010): pp. 2042-2071.

Osagiede, Edoseghe E., Quantifying the growth history of Seismically Imaged Normal Faults, Journal of Structural Geology, v66, Sep. 2014, pp. 382-399.

Rey, Patrice F. "Introduction to Structural Geology". Published Sep. 8, 2014; Accessed Aug. 9, 2017. Retrieved from the Internet: www.geosci.usyd.edu.au/users/prey/Patrice_Intro_to_SG.pdf pp. 39-40.

Wikipedia, "Geologic Time scale"; Jun. 4, 2015 pp. 1-10, https://en.wikipedia.org/wiki/Geologic_time_scale.

* cited by examiner

QUANTIFYING GEOLOGIC GROWTH HISTORY OF SUBSURFACE OIL FIELD STRUCTURES BASED ON STRUCTURAL GROWTH INDICATIONS WITH INSTRUCTIONS FROM DATA STORAGE DEVICE

This application is a divisional of, and claims priority for the filing date of, commonly owned, co-pending U.S. patent application Ser. No. 15/173,918, "QUANTIFYING GEOLOGIC GROWTH HISTORY OF SUBSURFACE OIL FIELD STRUCTURES BASED ON STRUCTURAL GROWTH INDICATIONS," filed on Jun. 6, 2016.

The present application is also related to commonly owned U.S. patent application Ser. No. 16/376,115, filed of even date herewith, entitled "DATA PROCESSING SYSTEM FOR QUANTIFYING GEOLOGIC GROWTH HISTORY OF SUBSURFACE OIL FIELD STRUCTURES BASED ON STRUCTURAL GROWTH INDICATIONS," and having the same inventor as the present application.

BACKGROUND OF THE INVENTION

1. Field of the Invention

The present invention relates to evaluation of subsurface oil field structure, and more particularly investigation of the geologic growth history of such a subsurface structure to obtain quantitative measures or indications of such history and thus whether the structure is likely to be charged with hydrocarbons.

2. Description of the Related Art

Under certain geological conditions, rocks become bent to form folds. Anticlinal folds of sediment rocks are the most important oil field structures. The relationship between the timing of folding and hydrocarbon source rock maturation and expulsion is one of the controlling factors on whether a structure is charged with hydrocarbons. As a petroleum geologist, one common task is to determine when a structure was formed. This technique provides a practical workflow to quantify fold growth history.

SUMMARY OF THE INVENTION

Briefly, the present invention provides a new and improved computer implemented method of forming in a data processing system a measure of structural growth as a function of geological time in subsurface formation layers of the earth based on relative differences in thickness of the formation layers over their extent through the earth. Formation data indicative of the thickness of the formation layers in a region of interest over their extent through the earth are received in the data processing system. Structural high points and low points of the formation layers in the region of interest are then identified. A measure of formation structural growth is determined as a function of geological time from the identified structural high points and low points of the formation layers and the geological era in time when the formations layers were formed. The determined measure of formation structural growth of the formation layers for the region of interest are assembled in memory of the data processing system. An output display image is then formed of the determined measure of formation structural growth of the formation layers for the region of interest.

The present invention also provides a new and improved data processing system for forming a measure of structural growth as a function of geological time in subsurface formation layers of the earth based on relative differences in thickness of the formation layers over their extent through the earth. The data processing system includes a processor which receives formation data indicative of the thickness of the formation layers in a region of interest over their extent through the earth, and also identifies structural high points and low points of the formation layers in the region of interest. The processor further determines a measure of formation structural growth as a function of geological time from the identified structural high points and low points of the formation layers and the geological era in time when the formations layers were formed, and assembles in memory of the data processing system the determined measure of measure of formation structural growth as a function of geological time. The memory of the data processing system stores the determined measure of formation structural growth as a function of geological time, and an output display of the data processing system forms a display of the determined measure of formation structural growth as a function of geological time.

The present invention also provides a new and improved data storage device which has stored in a computer readable medium non-transitory computer operable instructions for causing a data processing system to form a measure of structural growth as a function of geological time in subsurface formation layers of the earth based on relative differences in thickness of the formation layers over their extent through the earth. The instructions stored in the data storage device causing the data processing system to steps of receiving formation data indicative of the thickness of the formation layers in a region of interest over their extent through the earth, and identifying structural high points and low points of the formation layers in the region of interest. The instructions stored in the device also cause a step to be performed of determining a measure of formation structural growth as a function of geological time from the identified structural high points and low points of the formation layers and the geological era in time when the formations layers were formed. The instructions stored in the device also cause steps to be performed of assembling in memory of the data processing system the determined measure of formation structural growth of the formation layers for the region of interest, and forming an output display image of the determined measure of formation structural growth of the formation layers for the region of interest.

DETAILED DESCRIPTION OF THE PREFERRED EMBODIMENTS

Figure 1:
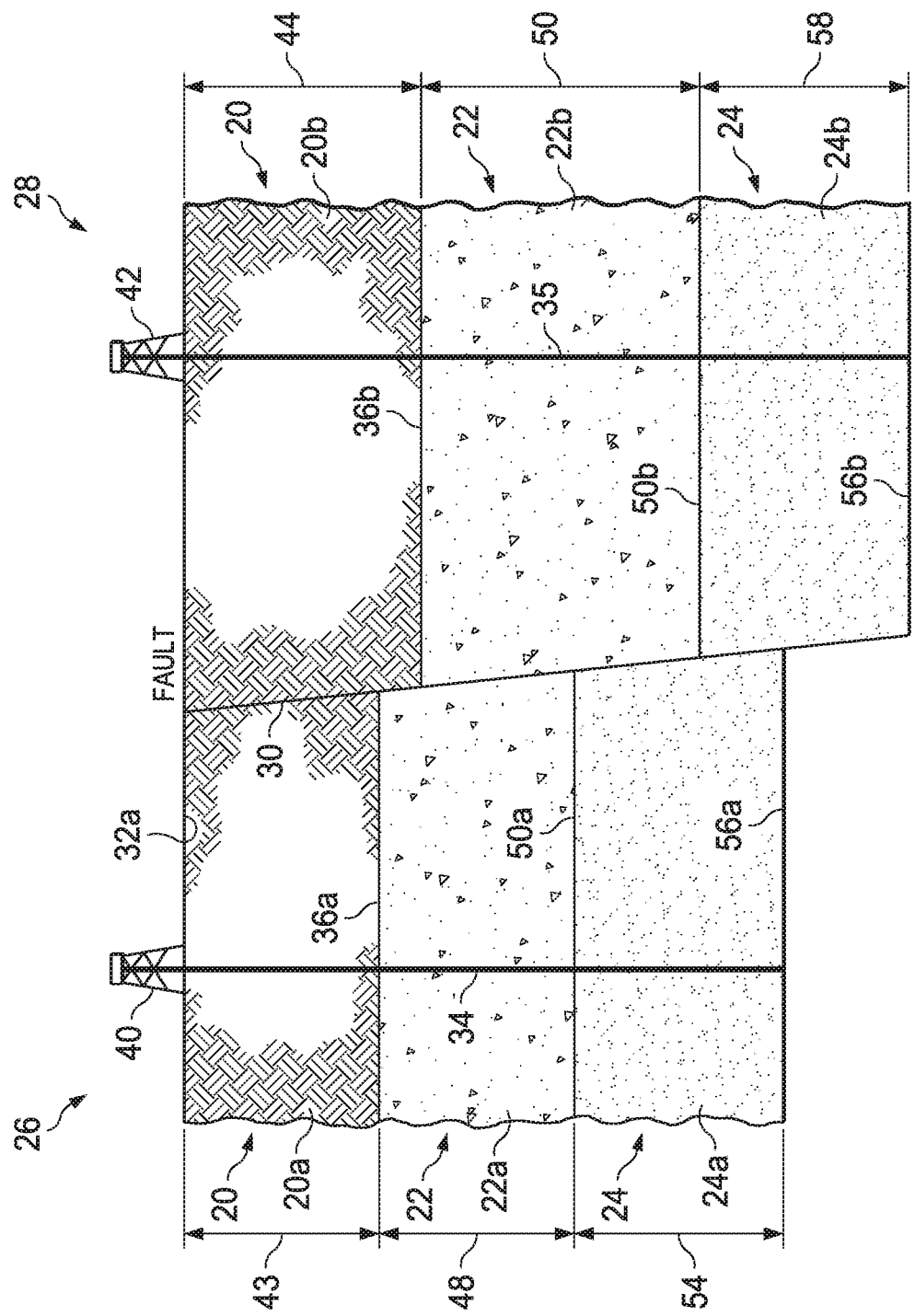
FIG. 1 is a schematic diagram of subsurface formations in the earth at a location of interest where a geological fault is present.
Figure 2:
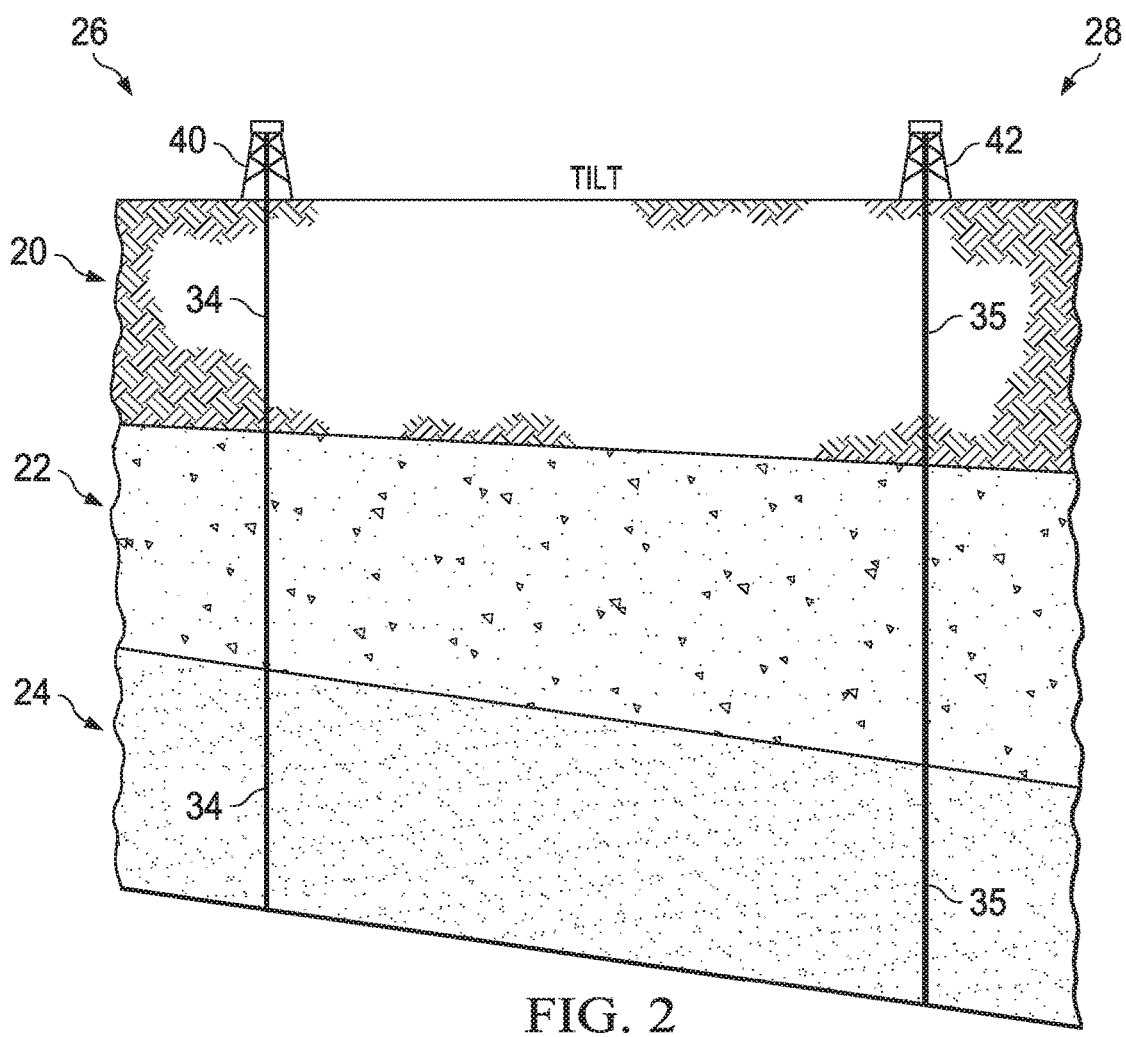
FIG. 2 is a schematic diagram of subsurface formations in the earth at a location of interest where formation tilt is present.
Figure 3:
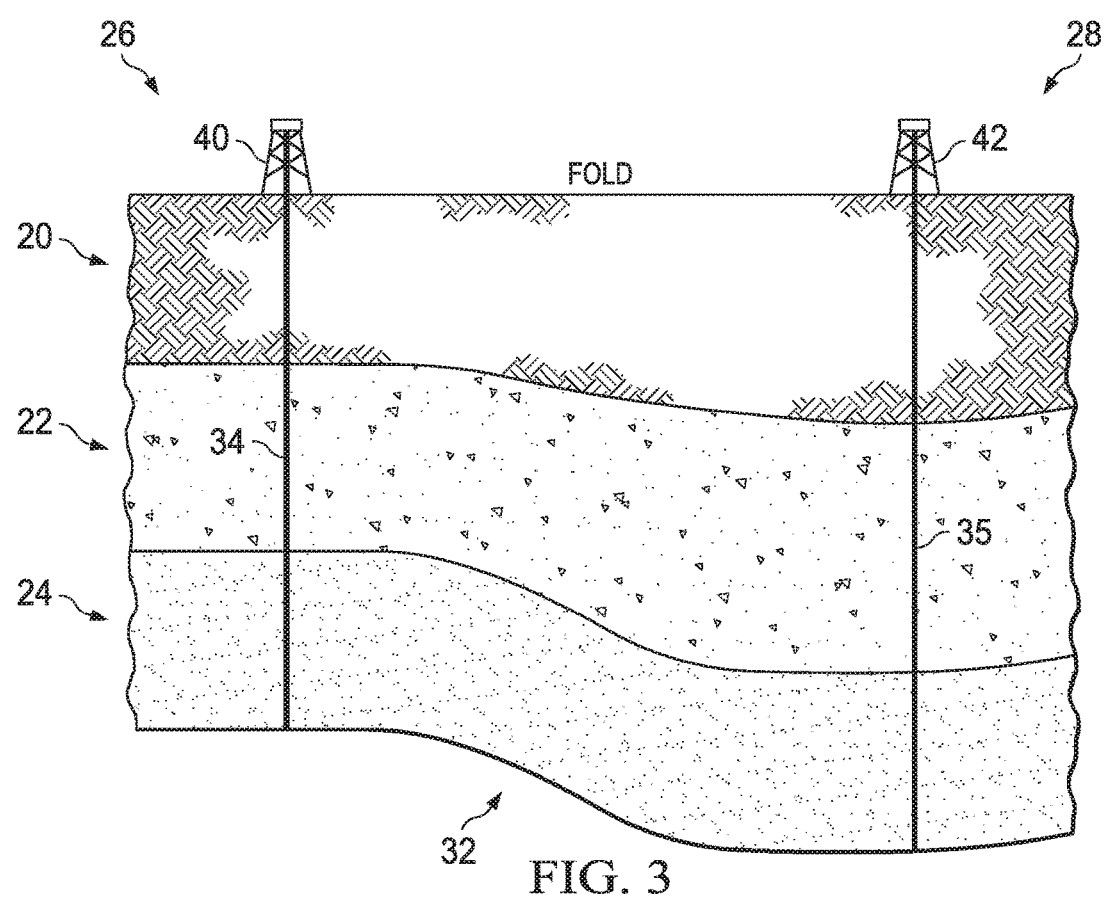
FIG. 3 is a schematic diagram of subsurface formations in the earth at a location of interest where a fold is present in the formations.

In the drawings, FIGS. 1, 2 and 3 represent several example subsurface formation layers or intervals 20, 22 and 24 of different rock strata and different thicknesses at successively lower depths in the earth at two positions of interest 26 and 28. FIG. 1 is a diagram of subsurface structure where a geological fault 30 is present. FIG. 2 is a diagram of subsurface structure where a tilt or monocline is present in the formation layers 20, 22 and 24. FIG. 3 is a diagram of subsurface structure where a fold 32 is present in the formation layers 20, 22 and 24. The layers in each of FIGS. 1, 2 and 3 bear like reference numerals since they are representative of typical geological structure or layering.

The geological structure shown in FIGS. 1, 2 and 3 represent examples of geological structure or layering where thickness measurements are available in one dimension, a downward dimension, at limited locations. Examples of such locations are outcrops or where wells have been drilled as schematically indicated by wells 34 and 35 extending through the layers 20, 22 and 24 from wellheads 40 and 42, respectively.

As schematically indicated in FIG. 1, the individual subsurface formation layers 20, 22 and 24 exhibit different individual thickness measurements at the two different positions shown. Thus, a portion 20a of layer 20 at position 26 at depth or level 32a has a thickness 43 extending downwardly from an upper depth level 32a to an interface 36a. Layer 20 was formed at a more recent geological time than lower layers 22 and 24. Portion 20a extends to the interface 36a between layers 20 and 22. As also seen in FIG. 1, a portion 20b of layer 20 at position 28 at depth or level 32b has a thickness 44 extending downwardly to an interface 36b between layers 20 and 22. The thickness 44 of layer 20 at location 28 can be seen to be greater than the thickness 43 of layer 20 at location 26.

Similarly, a portion 22a of layer 22 formed at an earlier geological time than layer 20 at position 26 has a thickness 48 extending downwardly from interface 36a to an interface 50a between layers 22 and 24. As also seen in FIG. 1, a portion 22b of layer 22 at position 28 at depth 36b has a thickness 50 extending downwardly an interface 50b between layers 22 and 24. The thickness 52 of layer 22 at location 28 can be seen to be greater than the thickness 48 of layer 22 at location 26.

In a corresponding manner, a layer 24 formed earlier than layer 22 is beneath layer 22. A portion 24a of layer 24 has at position 26 a depth 56a has a thickness 54 extending downwardly to an interface 56a between layer 24 and a next successively lower, earlier formed geological layer of lower earth layers. Layer 24 at position 28 extends downwardly to an interface 56b between layer 24 and the next lower of the successively deeper earth layers or strata. Further, a portion 24b of layer 24 at position 28 has a thickness 58 different from the thickness 54 of portion 24a.

In FIG. 2, the subsurface layers 20, 22 and 24 are representative of a geological tilt or monocline. The layers were originally horizontal, but have been caused over geological time to move into the tilted positions shown as a result of internal earth forces, resulting in the illustrated tilt from an otherwise horizontal sequence. The layers 20, 22 and 24 of FIG. 2 exhibit different thicknesses at positions 26 and 28 in a comparable manner to those described above in connection with FIG. 1.

FIG. 3 is a schematic representation of subsurface layers 20, 22 and 24 of a region where geological fold 32 is present as a result of movements in the earth's crust at some point in geologic time. Again, the layers 20, 22 and 24 of FIG. 3 exhibit different thicknesses at positions 26 and 28 in a comparable manner to those described above in connection with FIG. 1.

As described, the diagrams of FIGS. 1, 2 and 3 represent examples of geological structure or layering where thickness measurements are available at limited locations. FIGS. 1, 2 and 3 are also representations of subsurface geological structure where geological data is available over two dimensions, depth and extent along a survey line or bearing. An example is where a geological cross-section is available, or a two-dimensional seismic profile. The two-dimensional data is also indicated in FIG. 1. Two dimensional geological data according to the present invention can be based on geological mapping, well correlation of logging results from wells 34 and 35, interpretation of seismic survey results or some compilation or assembly of data from various ones of these sources. In such cases, the thickness data are obtained from selected locations on the two-dimensional cross-section, and have comparable characteristics to those described above for the one-dimensional geological data.

Figure 4:
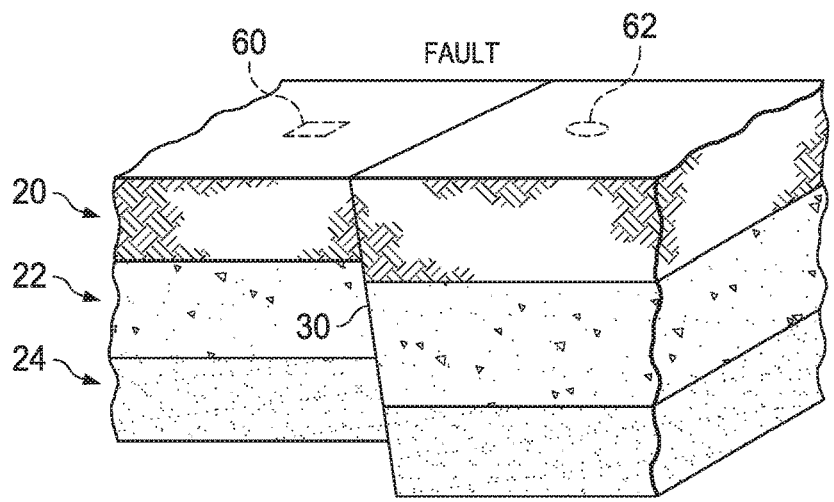
FIG. 4 is a schematic diagram of three dimensional subsurface formations in the earth at a location of interest where a geological fault is present.
Figure 5:
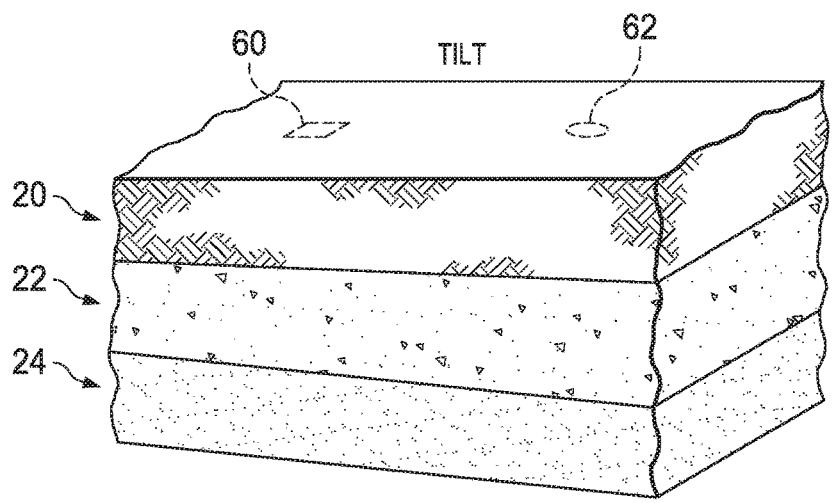
FIG. 5 is a schematic diagram of three dimensional subsurface formations in the earth at a location of interest where formation tilt is present.
Figure 6:
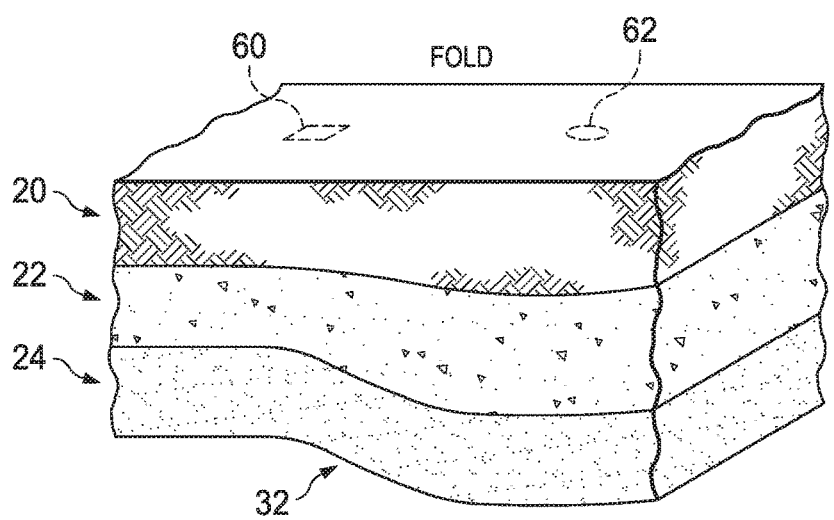
FIG. 6 is a schematic diagram of three dimensional subsurface formations in the earth at a location of interest where a fold is present in the formations.

FIGS. 4, 5 and 6 represent several example subsurface formation layers or intervals 20, 22 and 24 of different rock strata and different thicknesses available over three dimensions, such an area on the earth surface or beneath a body of water. Locations of interest at successively lower depths in the earth at two areal positions of interest indicated by a rectangle 60 and a circle 62 atop layer 20. The three-dimensional data represented in FIGS. 4, 5 and 6 can be based on geological mapping, well correlation, interpretation of seismic survey results or some gathering or collection of data from these data sources.

As schematically indicated in FIG. 4, a number of the individual subsurface formation layers 20, 22 and 24 exhibit different individual thickness measurements at the two different positions shown in a comparable manner to the layering in FIG. 1. Accordingly, like reference numerals are used to refer to like structural features. In FIG. 4, as in FIG. 1, a fault 30 is present. In the three-dimensional case shown in FIG. 4, the fault 30 is present as a plane rather than a line as shown in FIG. 1. Similarly, in FIG. 5, the subsurface layers 20, 22 and 24 are representative of a three-dimensional geological tilt or monocline. In FIG. 6, the fold 32 is in the form of a three-dimensional structure rather than the two-dimensional fold structure 32 in FIG. 3.

Figure 7:
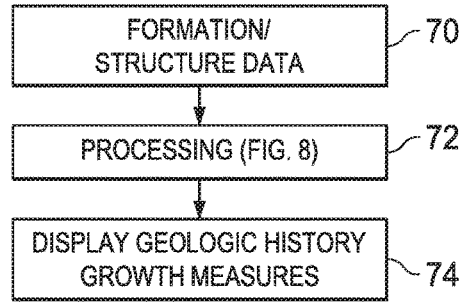
FIG. 7 is a schematic diagram of quantifying geologic growth history of subsurface oil field structures based on structural growth measures or indications according to the present invention.
Figure 8:
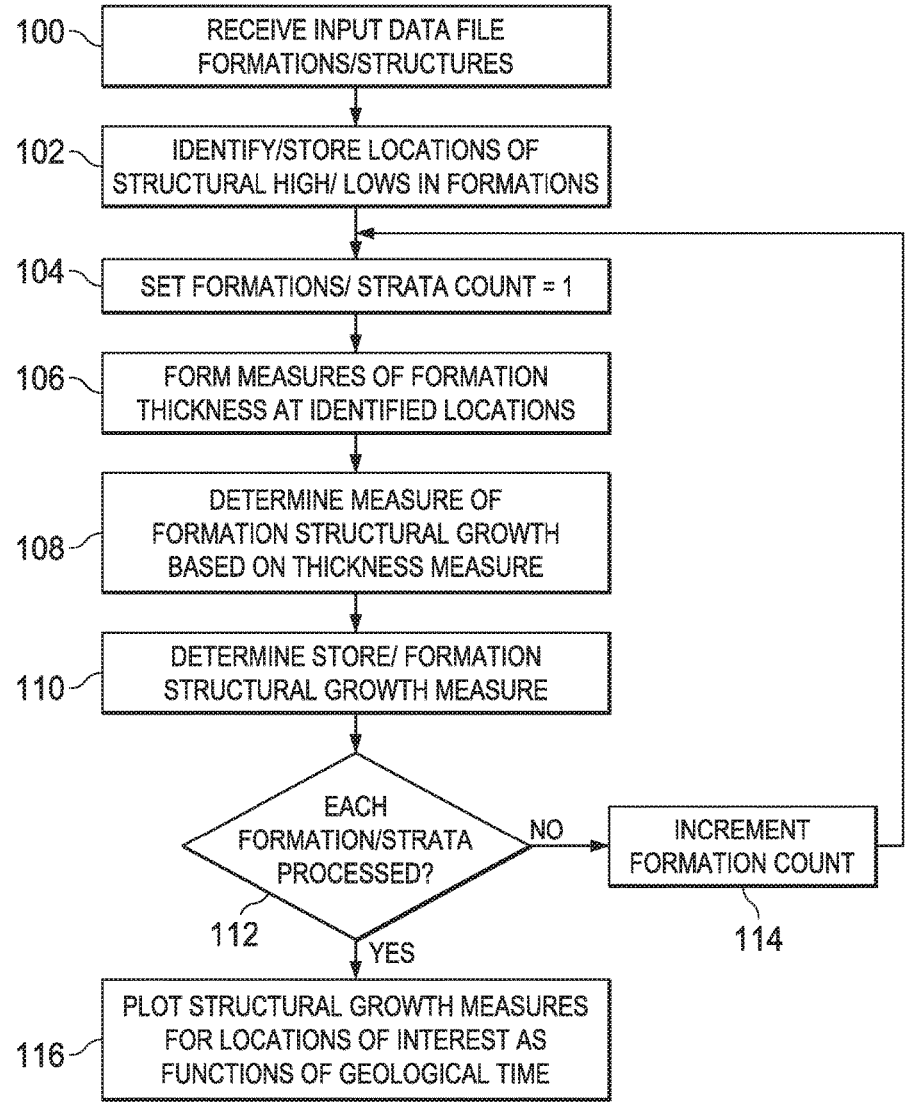
FIG. 8 is a functional block diagram of a set of data processing steps performed in a data processing system for quantifying geologic growth history of subsurface oil field structures based on structural growth measures or indications according to the present invention.

Subsurface structure such as that shown on the layer models of FIGS. 3 and 6 representing folds 32 are of particular interest according to the present invention. FIG. 7 is indicative of the general processing according to the present invention. As indicated at 70 input formation and structure data in digital format regarding subsurface geological features is obtained for processing. FIGS. 1 through 6 are schematic diagrams representative of the type of geological data representative of subsurface formation layering and structure. As indicated at step 72, the input formation and structure data received in step 70 is processed in a manner shown in more detail in a flow chart F shown in FIG. 8. As indicated at step 74, results of processing step 72 are then formed into geologic history growth measures for the particular subsurface layers or regions of interest.

When a geological fold, such as that indicated at 32 in FIGS. 3 and 6, starts growing and sedimentation continues, the sediments on structural highs (such as on top of an anticline with folds dipping away from upper portions) are thinner than that at structural lows (e.g. at a syncline location where folds dip upwardly from lower portions). The thickness differences between structural highs and lows in each of the formation layers affected by the fold indicate the folding magnitude for the given stratigraphic interval. With the present invention, it has been found that this physical phenomenon can be utilized to form a quantitative measure of the geologic growth history in subsurface layers in an area of interest. Further, the geologic times of the top and bottom of the interval define the time duration of such folding.

To quantify the structural development, a measure termed a structural growth index (or SGI) is defined by a ratio. The ratio of physical measures representing the SGI is set forth in Equation (1) below. The structural growth measure SGI represented by the difference in layer or interval thickness, measured at the locations of the structural high $T_h$ and the structural low (or basin) $T_b$ of the layer, over the interval thickness $T_b$ in the basin (or the thicker one in case of inversion), specifically:

$$SGI=(Tb-Th)/Tb \qquad (1)$$

Figure 9:
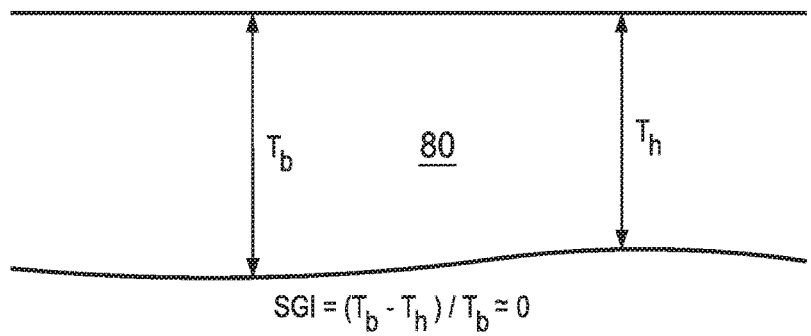
FIGS. 9, 10, 11, 12, 13, and 14 are simplified schematic diagrams of subsurface formations in the earth illustrating various structural growth measures or indications for quantifying geologic growth of the subsurface formations according to the present invention.

As can be seen in FIG. 9, a layer 80 has a generally uniform thickness over its entire lateral extent. Thus, the difference between a thickness $T_b$ of a layer or basin low and a thickness $T_h$ of a layer high is very small, close to zero in value. The structural growth measure SGI to layer 80 is thus also close to zero.

In the drawings, a flowchart F (FIG. 8) indicates a basic computer processing sequence of the present invention for performance of processing step 72 to determine a structural growth measure or SGI sequentially for a series of stacked layers or intervals as a function of geological time according to the present invention.

Figure 16:
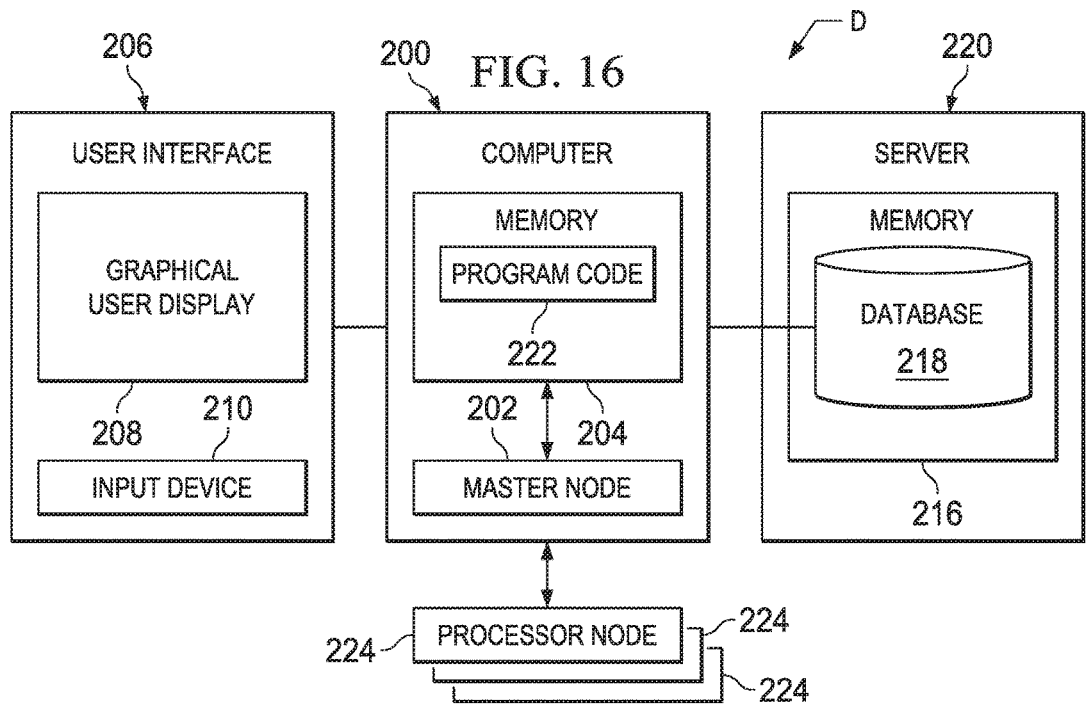
FIG. 16 is a schematic block diagram of a data processing system for quantifying geologic growth history of subsurface oil field structures based on structural growth measures or indications according to the present invention.

As indicated at step 100, an input data file is provided and received for processing in the data processing system D (FIG. 16). As described above. The input data file contains input information and structural data in digital format regarding the subsurface geological features of the layers or intervals for a region of interest. As mentioned, the input data files may take the form of one-dimensional thickness data from outcrops and wells, as well as two- and three-dimensional thickness data from geological maps, well correlations, seismic survey result interpretations or various collections or groups of such data.

During step 102, values for the structural highs $T_h$ and structural lows $T_b$ of each of the formations or layers over their extent are determined or selected, and the geographic position or co-ordinate noted and recorded where such structural highs and lows are present. Determination of values for structural highs $T_h$ and structural lows $T_b$ can be made by an analyst or made by an automated selection methodology in the data processing system D. For small numbers of data points over a single structure, an analyst can choose to measure the thickness manually. For large numbers of data points and over an area of many structures of concern, thickness measures can be obtained automatically through a user designed and programmed workflow on some commercial geoscience applications.

In step 104, a formation/strata counter register in the data processing system D is set to a beginning value of 1. Next, in step 106 measures of formation thickness at structural high $T_h$ and structural low $T_b$ for the layer currently being processed are formed based on the results of step 102. Step 108 is performed to determine a measure SGI of formation structural growth for the current layer according to the physical relationship specified in Equation (1) above. In step 110, the measure SGI of formation structural growth determined during step 108 for the current layer is stored in memory of the data processing system D.

Step 112 involves a determination whether each of a set of identified formation layers of interest has been processed. If not, the formation count register in the data processing system D is incremented by value of 1 during step 114, processing then returns to step 106 for forming measures of formation thickness for the next sequential layer, and processing continues.

If step 112 indicates that each of the set of identified formations of interest has been processed, step 116 follows. As indicated at step 116, the structural growth measures for locations of interest for any or all of the layers and locations of interest resulting from step 108 are displayed by the data processing system D. The displays may be requested singly or in groups automatically or at user request and may also be plotted as function of geological time, will be described.

Figure 10:
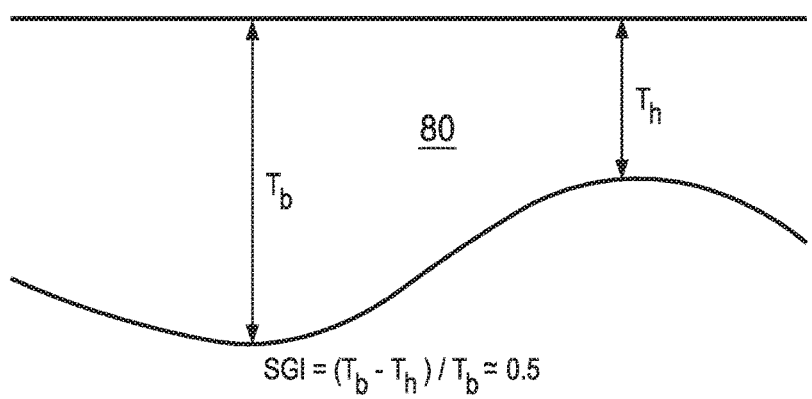
Figure 11:
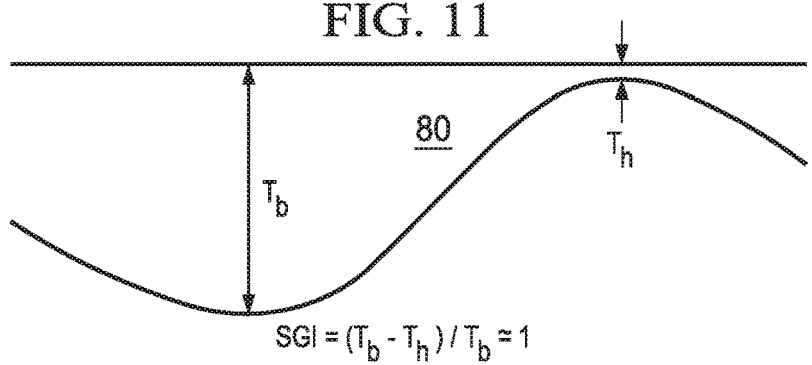
Figure 12:
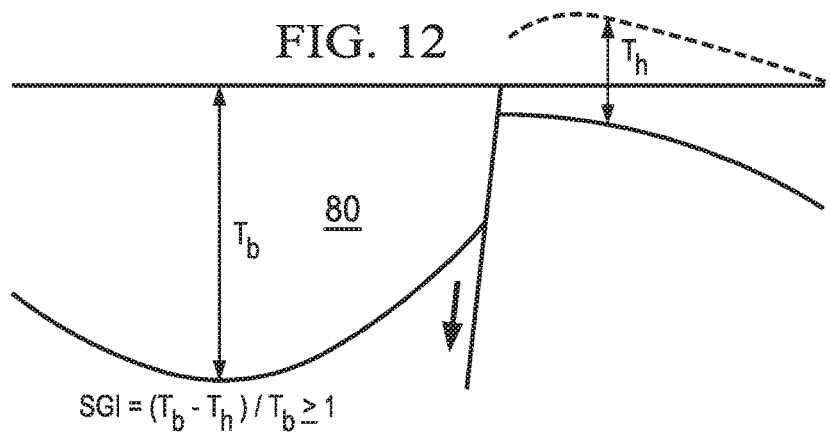
Figure 13:
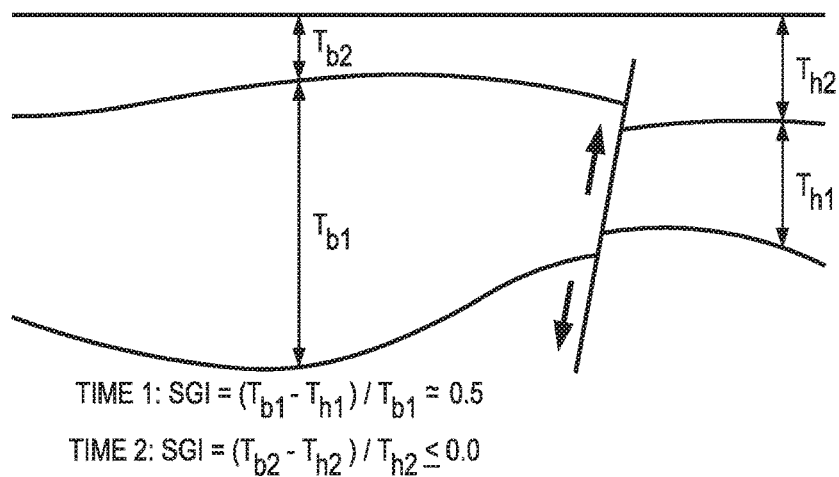

FIGS. 9 through 14 are simplified diagrams of example geological structural highs $T_h$ and lows $T_b$ and representative SGI measures for these geological layers or intervals. In general, an SGI measure is positive and ranges from very close to 0 to less than 1. A small SGI indicates minor growth (FIG. 9) or no growth. Large SGI measures indicate strong structural growth (FIG. 10 and FIG. 11). For very strong structural growth involving erosion at a structurally uplifted area (FIG. 12), the thickness is mathematically less than zero and a determined SGI measure can be greater than 1.

In the case of basin inversion (FIG. 13), where in Time 1, a basin (half-graben) developed in the hanging-wall of a normal fault, indicated by an SGI measure of about 0.5, based on $T_{b1}$ and $T_{h1}$ as shown, followed by a subsequent basin inversion in Time 2, the determined SGI measure is a negative number, based on $T_{b2}$ and $T_{h2}$.

Figure 14:
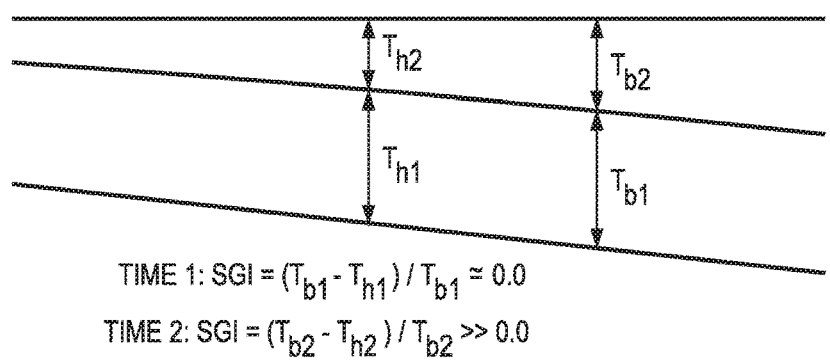

In case of regional tilting (FIG. 14), the determined SGI measure for pre-tilting strata will be near zero based on $T_{b1}$ and $T_{h1}$ as shown. The SGI for the tilting event as indicated by the layer thickness at Time 2 in FIG. 14 is a positive non-zero number, based on $T_{b2}$ and $T_{h2}$. In the case illustrated in FIG. 14, although there is no local structural growth, previously formed traps can be altered and/or shifted during regional tilting.

Several cautions should be taken when applying determined SGI measures to quantify structural growth. The first is to be aware of errors associated with seismic horizons, especially when data quality is low. Calculations using erroneous data can result in misleading or confusing numbers. Also measurements taken from local anomalies (such as what are known as bulls-eyes) should be avoided. Another caution to be taken occurs when strata thickness is small (a couple of hundreds of feet or less). In such cases, a small change in the gross thickness may generate a very large relative change in determined SGI measures because the denominator is a small number as a result of reduced layer thickness. In the case of basin inversion (as shown at Time 2 in FIG. 13), the sediment thickness in the prior basin location can be small and even zero or a negative (erosion). To avoid division by zero, the larger number $T_{h2}$ is used for the denominator.

Figure 15:
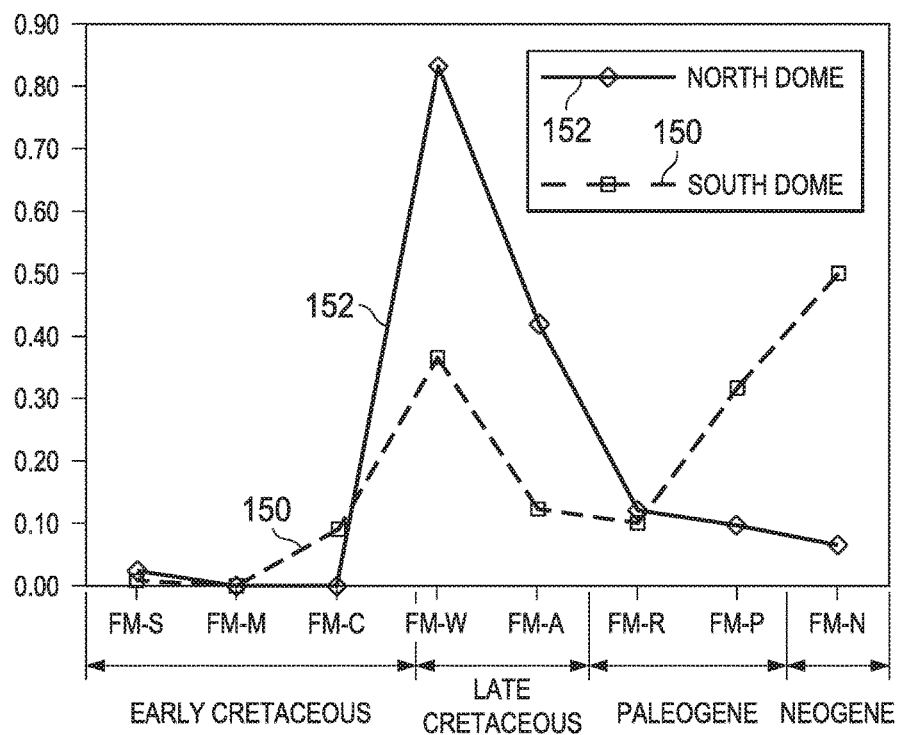
FIG. 15 is a plot of example structural growth measures or indications as a function of geological time determined for actual subsurface formations according to the present invention.

FIG. 15 shows a set of determined measures of structural growth, or the calculated SGI's for actual field structures. A curve 150 is a plot of determined measures of structural growth or SGI for a structure known as a south dome in that field, and a curve 152 is a plot of determined measures of structural growth or SGI for a structure known as a north dome. Curves 150 and 152 are plotted as functions for mapped geologically identified seismic horizons designated FM-S, FM-M, FM-C, FM-W, FM-A, FM-R, FM-P, FM-N, and seafloor of the field. The geologic time range, as identified in FIG. 15, is from Cretaceous (Early Cretaceous, Late Cretaceous) through Tertiary to present day. It is clearly revealed from curve 152 in FIG. 15 that the north dome was developed during Mid-to-Late Cretaceous and has had very minor or no subsequent development since. To the contrary, the south dome is indicated from curve 150 to have had a moderate growth during mid-to-Late Cretaceous, while much stronger development took place in the Late Tertiary time (Neogene).

The structural growth measure SGI is determined according to the present invention for a series of stacked intervals sequentially and plotted against the geologic times implied by the stratigraphic intervals. As a result, the structural growth history of a feature or region of interest is revealed graphically over the geologic time span represented by the horizons mapped. As shown in FIG. 15, the structural growth measures or SGI's were calculated and plotted for the two domes of a known field to quantify geological development measures not otherwise available. Although the domes form the same field, the north dome developed mainly in mid-to-Late Cretaceous, while the south dome experienced a moderate growth in the mid-to-Late Cretaceous, but major growth came in late Paleogene and accelerated in Neogene.

Several important exploration and development implications can be made from FIG. 15. For hydrocarbon risk, assuming a Jurassic source rock maturation and expulsion occurred in Late Cretaceous to Early Tertiary, the Early Cretaceous and older reservoirs in the North Dome will have less charge risk than the South Dome. Further, assuming the hydrocarbon charge occurred in a reduced amount, during Tertiary and after, the South Dome will not likely fill to the spill point. Also, assuming hydrocarbon re-migration occurred during the Cenozoic structural event, the South Dome will likely contain oil only with no gas cap and have a shallower oil/water contact than in the North Dome.

As illustrated in FIG. 16, the data processing system D includes a computer 200 having a master node processor 202 and memory 204 coupled to the processor 202 to store operating instructions, control information and database records therein. The data processing system D is preferably a multicore processor with nodes such as those from Intel Corporation or Advanced Micro Devices (AMD), or an HPC Linux cluster computer. The data processing system D may also be a mainframe computer of any conventional type of suitable processing capacity such as those available from International Business Machines (IBM) of Armonk, N.Y. or other source. The data processing system D may in cases also be a computer of any conventional type of suitable processing capacity, such as a personal computer, laptop computer, or any other suitable processing apparatus. It should thus be understood that a number of commercially available data processing systems and types of computers may be used for this purpose.

The computer 200 is accessible to operators or users through user interface 206 and are available for displaying output data or records of processing results obtained according to the present invention with an output graphic user display 208. The output display 208 includes components such as a printer and an output display screen capable of providing printed output information or visible displays in the form of graphs, data sheets, graphical images, data plots and the like as output records or images.

The user interface 206 of computer 200 also includes a suitable user input device or input/output control unit 210 to provide a user access to control or access information and database records and operate the computer 200. Data processing system D further includes a database of data stored in computer memory, which may be internal memory 204, or an external, networked, or non-networked memory as indicated at 216 in an associated database 218 in a server 220.

The data processing system D includes program code 222 stored in non-transitory memory 204 of the computer 200. The program code 222 according to the present invention is in the form of computer operable instructions causing the data processor 202 to form measurements of hydrocarbon content of a shale gas reservoir according to the present invention in the manner that has been set forth.

It should be noted that program code 222 may be in the form of microcode, programs, routines, or symbolic computer operable languages that provide a specific set of ordered operations that control the functioning of the data processing system D and direct its operation. The instructions of program code 222 may be stored in memory 204 of the data processing system D, or on computer diskette, magnetic tape, conventional hard disk drive, electronic read-only memory, optical storage device, or other appropriate data storage device having a computer usable non-transitory medium stored thereon. Program code 222 may also be contained on a data storage device such as server 220 as a non-transitory computer readable medium, as shown.

The data processing system D may be comprised of a single CPU, or a computer cluster as shown in FIG. 4, including computer memory and other hardware that makes it possible to manipulate data and obtain output data from input data. A cluster is a collection of computers, referred to as nodes, connected via a network. Usually a cluster has one or two head nodes or master nodes 202 that are used to synchronize the activities of the other nodes, referred to as processing nodes 224. The processing nodes 224 each execute the same computer program and work independently on different segments of the grid which represents the reservoir.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A data storage device having stored in a computer readable medium non-transitory computer operable instructions for causing a data processing system, comprising a processor, a memory, and a display, to form a measure of geologic folding indicating geologic growth history of a formation layer in a subsurface oil field structure over geological time, the formation layer being one of a plurality of formations at successively lower depths in the earth, the formed measure of geologic folding being indicative of whether the layer is charged with hydrocarbons, the measure being formed based on: (1) relative differences in thickness, and (2) identified locations of greatest thickness and least thickness of the formation layer over its extent through the earth, the instructions stored in the data storage device causing the data processing system to perform the following steps:

(a) receiving in the memory geological data indicative of rock strata thickness and structure of the plurality of formation layers over their extent through the earth in a region of interest;

(b) determining in the processor thickness differences of the plurality of formation layers between identified locations of greatest thickness and of least thickness;

(c) determining in the processor a measure of magnitude of geologic folding indicating geologic growth history of the formation layer in the region of interest from the determined thickness difference of the formation layer at the identified locations of greatest thickness and of least thickness;

(d) assembling in memory of the data processing system the determined measure of magnitude of geologic folding of the formation layers for the region of interest; and (e) forming an output display image of the determined measure of magnitude of geologic folding of the layers for the region of interest over geologic time to indicate if the formation layer is charged with hydrocarbons.

2. The data storage device of claim 1, wherein the instructions further include instructions causing the data processing system to perform the steps of:

determining whether measures of magnitude of geologic folding have been determined for each of the formation layers in the region of interest; and if not, incrementing a formation designator increment to the next formation layer of interest; and returning to the step of determining a measure of formation structural growth for the next formation layer of interest.

3. The data storage device of claim 1, wherein the received geological data indicative of the rock strata thickness and structure of the formation layers comprises data obtained from wells drilled in the region of interest.

4. The data storage device of claim 1, wherein the received geological data indicative of the rock strata thickness and structure of the formation layers comprises a geological cross-section obtained from geological structure of the region of interest.

5. The data storage device of claim 1, wherein the received geological data indicative of the rock strata thickness and structure of the formation layers comprises well correlation data obtained from wells in the region of interest.

6. The data storage device of claim 1, wherein the received geological data indicative of the rock strata thickness and structure of the formation layers comprises geological mapping data obtained from geological structure of the region of interest.

7. The data storage device of claim 1, wherein the received geological data indicative of the rock strata thickness and structure of the formation layers comprises seismic survey results obtained from a seismic survey of the region of interest.

* * * * *